Patented May 6, 1952

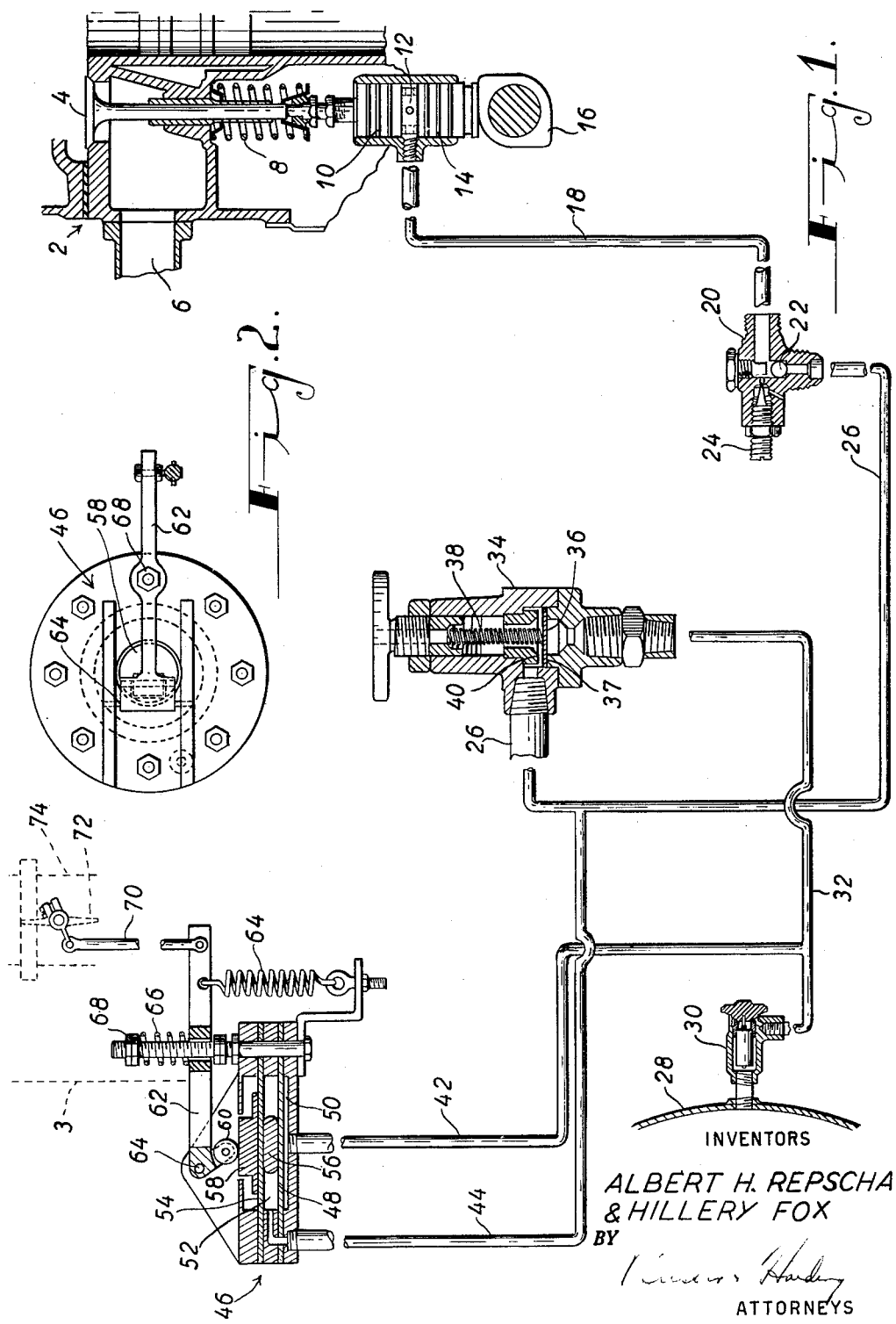

2,595,369

UNITED STATES PATENT OFFICE 2,595,369

GOVERNING MECHANISM FOR ENGINE-DRIVEN COMPRESSORS

Albert H. Repscha, Devon, and Hillery Fox, West Chester, Pa., assignors to Schramm, Inc., West Chester, Pa., a corporation of Pennsylvania Application July 15, 1947, Serial No. 761,092

2 Claims. (Cl. 230—3)

This invention relates to governing means for engine driven compressors and has particular reference to speed governing means responsive to pressures in the air tank of a compressor combined with means for unloading the compressor.

The object of the present invention is, generally, the control of the speed of an engine in proper relationship to the demands on the compressor driven thereby and in particular with the maintenance of operation of more continuous nature than has occurred heretofore. Heretofore it has been customary to produce unloading of a compressor when the pressure in the air supply tank reaches a certain maximum value with simultaneous reduction of the engine speed to an idling speed from the full speed thereof. This condition is then maintained until a predetermined minimum pressure exists in the supply tank whereupon the engine is speeded up to full speed and reloading of the compressor occurs with some slight delay necessary to permit the engine to pick up speed.

In accordance with the present invention the engine operates at full speed when the pressure in the supply tank is at its minimum value. As this pressure increases the speed of the engine is gradually reduced until when the maximum pressure desired in the supply tank is approached the engine may be operating at half speed or some other suitable fraction of its full speed. Then when the maximum pressure is reached through a slight increase of pressure unloading occurs and the engine is slowed down to an idling speed. As air is drawn from the tank and the pressure therein decreases the engine continues to operate at idling speed until a predetermined value of pressure is reached when in quick succession the engine is brought up to the speed corresponding to the pressure in the tank and the compressor is reloaded with a repetition of the cycle. It will be obvious that the cycle just described involves longer periods of operation of the engine at speeds less than full speed when the demands on the compressors are moderate, i. e., there is an operation of the engine corresponding more nearly to the demands on the compressor to approach continuous operation. The result is less wear on the engine as well as on the parts which are involved in the unloading operation.

The general objects of the invention are concerned with the attainments of the foregoing results. These and other objects particularly relating to details of construction and operation will become apparent from the following description read in conjunction with the accompanying drawing in which:

Figure 1 is a diagrammatic view illustrating certain mechanical parts of the invention in section; and Figure 2 is a plan view of a novel control mechanism illustrated in the upper left-hand portion of Figure 1.

A compressor indicated at 2 is driven by an internal combustion engine indicated at 3. The compressor and engine need not be separate units but in accordance with conventional practice in this art the compressor may be constituted by the partial rebuilding of a multicylinder engine to transform certain of the cylinders into compressor cylinders. Where an engine and a compressor are hereinafter referred to it will be understood that they may be separate devices connected by suitable shafting or may alternatively be merely separate parts of a single unitary structure. In any event, an engine of one or more cylinders may be considered to be driving a compressor similarly having one or more cylinders.

Various parts illustrated in Figure 1 will be found to have their counterparts in Gustafson Patents 2,023,418 and 2,160,860, dated, respectively, December 10, 1935 and June 6, 1939. Unloading is preferably achieved in the fashion described in these patents by maintaining open the intake valve or valves 4 which control the entry of air from an intake manifold 6. This method of unloading is highly satisfactory in that it involves a minimum amount of work done by the compressor during an unloading period. It will, of course, be evident that so far as the present invention is concerned unloading may be accomplished in any of the other conventional and usual fashions.

As disclosed, the inlet valves 4 are urged closed by springs 8 and are provided with pistons 10 which are normally acted upon by cam followers 14 engageable by cams 16 on a conventional cam shaft. The piston 10 and the cam follower 14 are mechanically separate but normally in engagement during loaded periods of the compressor. A chamber 12 located between these elements has communication with a line 18 through which compressed air is admitted when unloading is to be accomplished to lift the piston 10 away from the cam follower 14 to produce opening of the inlet valve independently of the cam operation. The line 18 communicates with a check valve and bleeder mechanism indicated at 20 provided with a ball check 22 and a needle valve 24 arranged for adjustable bleeding of air from the line 18 to the atmosphere. The check valve 22 permits free flow of air from a line 26 to the line 18 but prevents substantial reverse flow.

An unloader valve 34 is provided with a disc 36 operating between a lower seat 37 and an upper seat 40, the disc being normally urged downwardly by a spring 38. The space above the seat 40 is open to the atmosphere. The space below and inside the seat 37 is connected through a line 32 and water and oil filter 30 to the supply tank 28 which receives compressed air from the compressor. Reference to the aforementioned Gustafson patents will reveal that the parts so far described are essentially as indicated in those patents.

In accordance with the present invention lines 42 and 44 are respectively connected to the lines 32 and 26, respectively, and lead to a control device indicated generally at 46. This device provides members forming a housing in which are mounted diaphragms 48 and 54 to define a lower chamber 50 in communication with the line 42 and an intermediate chamber 52 in communication with the line 44. A spacer 56 is located between the diaphragms and the upper face of the diaphragm 54 carries a member 58 on which bears a roller 60 carried by a lever 62 pivoted to the device 46 at 64. The lever 62 is urged downwardly by a tension spring 64 and also by an adjustable compression spring 66, the pressure exerted by which is varied through nuts 68. A link 70 connects the end of lever 62 with the throttle valve 72 in the intake connection 74 of the engine 3. The intake connection 74 is connected to the carbureter and intake manifold of the engine.

The diaphragms 48 and 54 are flexible and hence the effective area of the diaphragm 48 is the area of the spacer 56 in contact with it, while the effective area of the diaphragm 54 is the area of the member 58 in contact with it. The latter area, it will be noted, is substantially greater than the former. It is also to be noted that the roller 60 as arranged on the lever 62 is such that as movement is imparted to the lever the effective lever arm at the roller 60 is substantially increased. This is desirable for the most satisfactory type of operation.

The operation of the mechanism described will be best understood by considering initially that the tank 28 is at minimum pressure and the compressor is loaded, pumping air into the tank. Under these conditions the disc 36 rests on the seat 37 and the line 26 is vented to the atmosphere, the line 18 being also at atmospheric pressure by reason of leakage through the bleeder needle valve 24. The inlet valve 4 is accordingly operated by the cams 16. At this same time through connection 42 the chamber 50 is subjected to the tank pressure while chamber 52 is under atmospheric pressure due to the connection of line 44 with the line 26. The pressure in the chamber 50 acts only on the effective area of contact between the diaphragm 48 and the spacer 56 so that the upward force on the roller 60 is a minimum.

As the pressure in the tank rises the force acting on the roller 60 increases and the throttle valve 72 is moved correspondingly toward closed position. The fact that this valve becomes more and more effective in throttling the intake as its angular change approaches the closed position is taken care of by the increased lever arm of the roller 60, the effect being an increased rate of change of the position of the lever 62 as the pressure in the chamber 50 increases. Adjustments may be made to secure any desired reduction in speed as the pressure in the tank 28 increases. For example, to consider for clarity typical figures, let it be assumed that the minimum tank pressure is 85 pounds per square inch and under such conditions that the engine operates at 1200 R. P. M. Then at a pressure such as 105 pounds per square inch the control of the throttle 72 may result in a decrease of the engine speed to 600 R. P. M., the speed variation between these figures being continuous with variation of pressure. If 105 pounds per square inch is regarded as the maximum tank pressure desired then the adjustment of the pilot valve 34 is such that at about this pressure value the disc 36 will be snapped upwardly against the seat 40 by the pressure beneath it with the result that the tank pressure is applied through the line 26 to unload the compressor by action on the piston 10 and simultaneously is applied to the chamber 52 through the line 44. The snap action of the pilot valve is as described in said Gustafson patents and need not be repeated here. It need only be noted that the area of the disc subjected to the tank pressure is substantially increased when it rises from the seat 37 so that it will not return to that seat until the tank pressure drops quite substantially. A stable snap action is thus secured.

When the tank pressure is applied to the chamber 52 it will then be acting upon the increased area represented by the excess area of the member 58 over the area of the spacer 56 and consequently a considerably greater force acts upon the roller 60. The throttle 72 is accordingly closed to idle position limited by the usual adjustable stop which is not shown. The engine accordingly has its speed reduced to idling speed which may, for example, be about 400 R. P. M.

The idling condition then continues until the pressure in the supply tank drops to such value that the spring 38 will force the disc 36 downwardly against the seat 37. Consistent with the figures previously given this might, for example, occur at 90 pounds per square inch. Until this occurs, even though the tank pressure has decreased, the engine throttle will not be opened because the increased effective diaphragm area exposed to tank pressure is sufficient to hold the throttle in idling position.

As soon as the disc 36 is seated at 37 the lines 26 and 44 are open to the atmosphere and accordingly the throttle will be opened to provide an engine speed corresponding to the pressure then existing in the supply tank. The check valve 22 closes and the pressure in the line 18 and chamber 12 is reduced by their venting to the atmosphere through the needle valve 24. With some delay, therefore, sufficient to permit the engine to come up to speed, the reloading of the compressor occurs. The cycle may then be repeated.

It will be evident that due to the continuous variation of engine speed with supply tank pressure there will be a considerable range of demands on the supply tank less than the maximum demand corresponding to which unloading will not occur since the displacement of the compressor is reduced to the demand, through reduction of speed, and the tank pressure will not rise to the unloading pressure. Only under conditions of a demand less than that corresponding to the lowest controllable speed of the compressor will the tank pressure rise to the pressure effecting unloading. For sustained periods accordingly there will be continuous operation of the compressor at variable speeds less than full speed without the occurrence of an unloading operation.

What we claim and desire to protect by Letters Patent is:

1. Governing means for an engine driven compressor having speed controlling means operating the engine throttle and a supply tank for air compressed by said compressor, said governing means comprising a housing, a first air pressure responsive diaphragm within said housing, means supplying air pressure from said supply tank to one side of said diaphragm within said housing, a second air pressure responsive diaphragm within said housing spaced from said first mentioned diaphragm, means supplying air pressure from said supply tank to one side of said second diaphragm within said housing and to the other side of said first mentioned diaphragm when air pressure in said tank exceeds a predetermined value, means positioned between said diaphragms operatively connecting said diaphragms, and means operatively connected to said second diaphragm responsive to motion of said second diaphragm for actuating said speed controlling means with an increasing rate of response to displacement motion of the diaphragm, said first air pressure responsive diaphragm in response to air pressure applied to said one side thereof acting through said means operatively connecting said diaphragms and said means actuating said speed controlling means to control the speed of the engine continuously throughout a predetermined range of pressure in said supply tank, and said second diaphragm acting through said means actuating said speed controlling means to reduce the speed of the engine to a predetermined fixed speed when air pressure from said supply tank is applied thereto.

2. Governing means for an engine driven compressor having speed controlling means operating the engine throttle and a supply tank for air compressed by said compressor, said governing means comprising a housing, a first air pressure responsive diaphragm within said housing, means supplying air pressure from said supply tank to one side of said diaphragm within said housing, a second air pressure responsive diaphragm within said housing spaced from said first mentioned diaphragm, means supplying air pressure from said supply tank to one side of said second diaphragm within said housing and to the other side of said first mentioned diaphragm when air pressure in said tank exceeds a predetermined value, means positioned between said diaphragms operatively connecting said diaphragms, and means operatively connected to said second diaphragm responsive to motion of said second diaphragm for actuating said speed controlling means, said first mentioned air pressure responsive diaphragm having a smaller effective area for the action of the air pressure on the first side thereof than the effective area of said second mentioned diaphragm for the action of air pressure thereon and acting through said means operatively connecting said diaphragms and said means actuating said speed controlling means to control the speed of the engine continuously throughout a predetermined range of pressure in said supply tank, and said second diaphragm acting through said means actuating said speed controlling means to reduce the speed of the engine to a predetermined fixed speed when air pressure from said supply tank is applied thereto.

ALBERT H. REPSCHA.
HILLERY FOX.

REFERENCES CITED

The following references are of record in the file of this patent:

UNITED STATES PATENTS

| Number | Name | Date |
| --- | --- | --- |
| 1,416,092 | Knaak | May 16, 1922 |
| 2,023,418 | Gustafson | Dec. 10, 1935 |
| 2,135,248 | Aikman | Nov. 1, 1938 |
| 2,160,860 | Gustafson | June 6, 1939 |
| 2,211,875 | Aikman | Aug. 20, 1940 |
| 2,212,631 | Baker | Aug. 27, 1940 |
| 2,380,226 | Frantz | July 10, 1945 |
| 2,410,824 | Lamberton | Nov. 12, 1946 |
| 2,421,872 | Evelyn | June 10, 1947 |

FOREIGN PATENTS

| Number | Country | Date |
| --- | --- | --- |
| 529,417 | Germany | 1931 |